United States Patent
Kusumi

(10) Patent No.: US 12,205,245 B2
(45) Date of Patent: Jan. 21, 2025

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Yuichi Kusumi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 336 days.

(21) Appl. No.: 17/666,649

(22) Filed: Feb. 8, 2022

(65) Prior Publication Data

US 2022/0270211 A1    Aug. 25, 2022

(30) Foreign Application Priority Data

Feb. 24, 2021   (JP) ................. 2021-027596

(51) Int. Cl.
*G06T 5/00* (2024.01)
*G06T 5/10* (2006.01)
*H04N 25/48* (2023.01)
*H04N 25/615* (2023.01)

(52) U.S. Cl.
CPC ............... *G06T 5/00* (2013.01); *G06T 5/10* (2013.01); *H04N 25/48* (2023.01); *H04N 25/615* (2023.01)

(58) Field of Classification Search
CPC .......... G06T 5/00; G06T 5/10; G06T 3/4015; G06T 5/73; G06T 2207/10016; G06T 2207/10024; G06T 2207/20192; G06T 2207/30208; G06T 5/50; H04N 25/48; H04N 25/615; H04N 25/61
See application file for complete search history.

(56) References Cited

U.S. PATENT DOCUMENTS

| 5,748,371 A | 5/1998 | Cathey, Jr. et al. |
| 2012/0050583 A1* | 3/2012 | Watanabe ................. G06T 5/73 348/241 |
| 2012/0188387 A1 | 7/2012 | Ogasahara |
| 2013/0050541 A1* | 2/2013 | Hatakeyama .......... H04N 23/80 348/E5.079 |
| 2015/0199795 A1* | 7/2015 | Naruse ..................... G06T 5/73 382/260 |
| 2017/0155881 A1* | 6/2017 | Mikawa ............... H04N 13/106 |
| 2018/0255251 A1* | 9/2018 | Ajito .................... H04N 25/611 |

FOREIGN PATENT DOCUMENTS

| JP | H11500235 A | 1/1999 |
| JP | 2012069099 A | 4/2012 |
| JP | 2012156778 A | 8/2012 |
| JP | 2019013046 A | 1/2019 |

* cited by examiner

*Primary Examiner* — Chan S Park
*Assistant Examiner* — Daniel C Chang
(74) *Attorney, Agent, or Firm* — ROSSI, KIMMS & McDOWELL LLP

(57) ABSTRACT

An image processing apparatus includes at least one processor or circuit configured to execute a plurality of tasks including an image acquiring task configured to acquire a first image and a second image that have been obtained by imaging at imaging positions different from each other, an image restoration processing task configured to acquire a first restored image and a second restored image by performing image restoration processing for the first image and the second image respectively, and a pixel increasing processing task configured to acquire a pixel increased image using the first restored image and the second restored image.

17 Claims, 9 Drawing Sheets

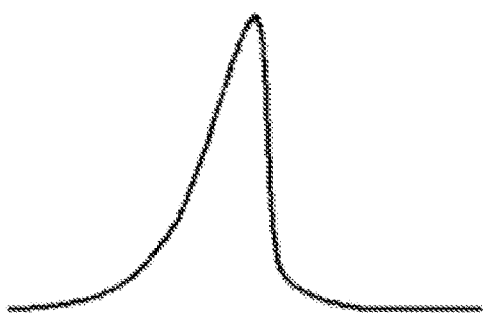
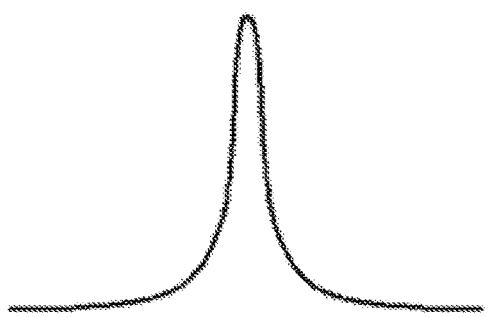
FIG. 3A
FIG. 3B
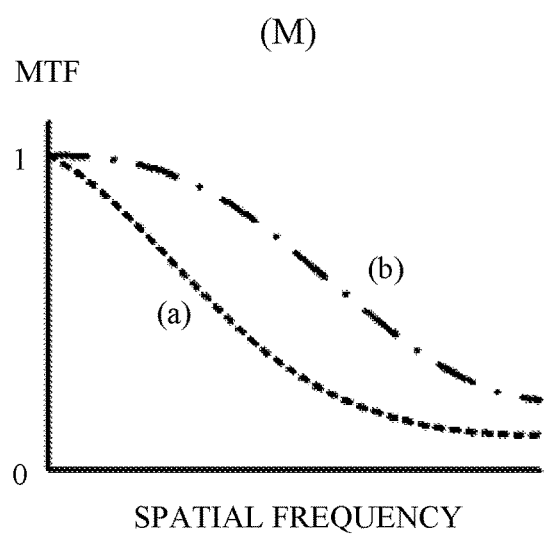
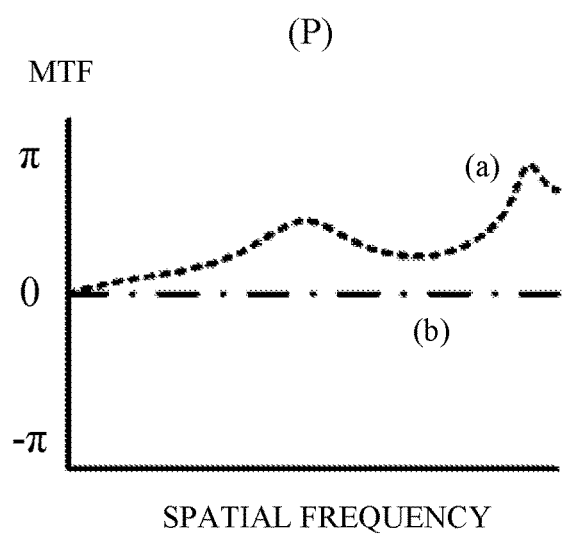
FIG. 4

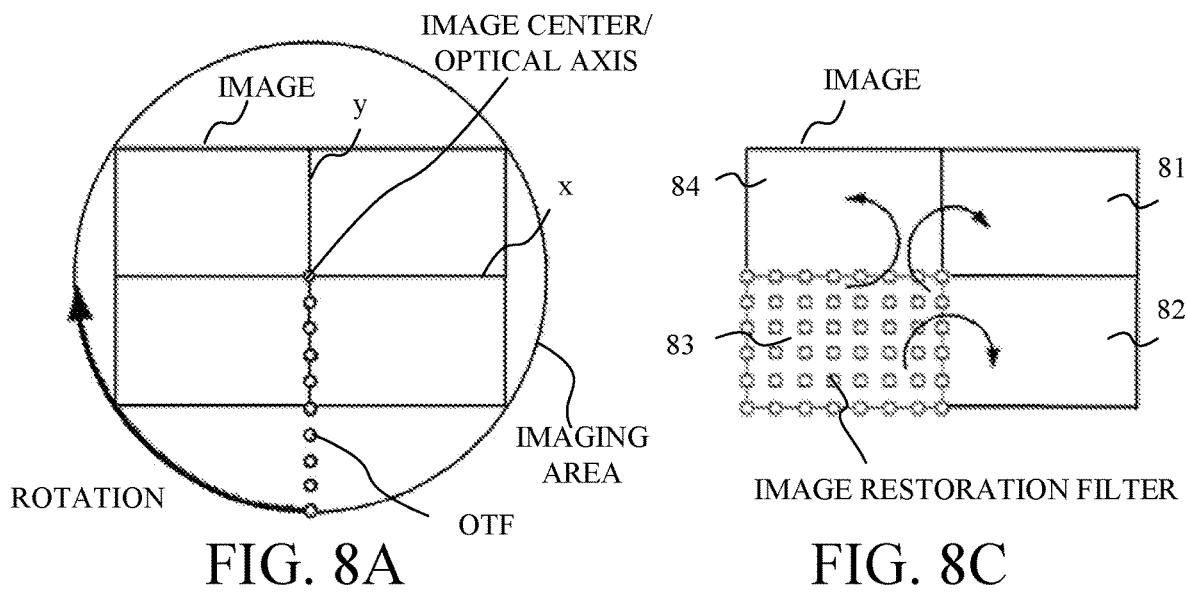
FIG. 8A
FIG. 8C
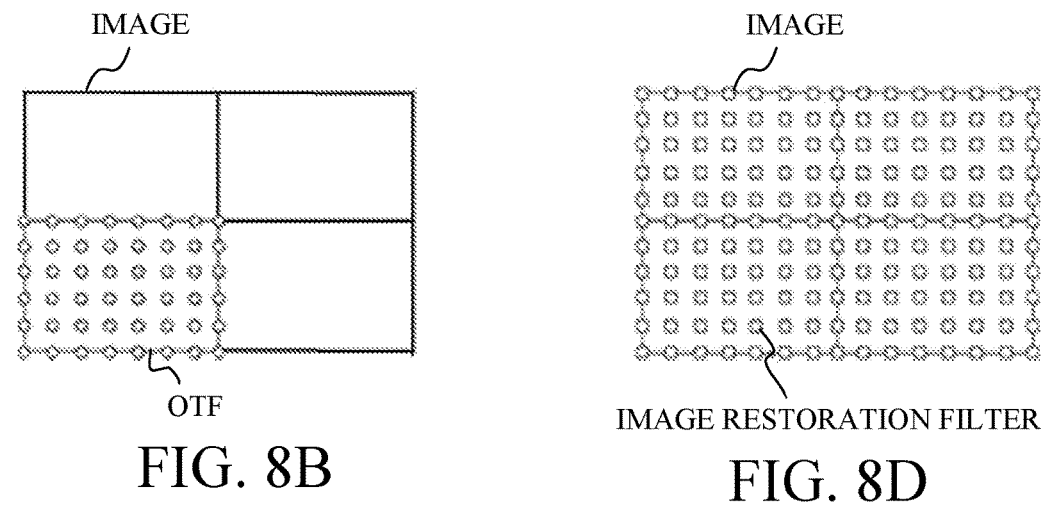
FIG. 8B
FIG. 8D
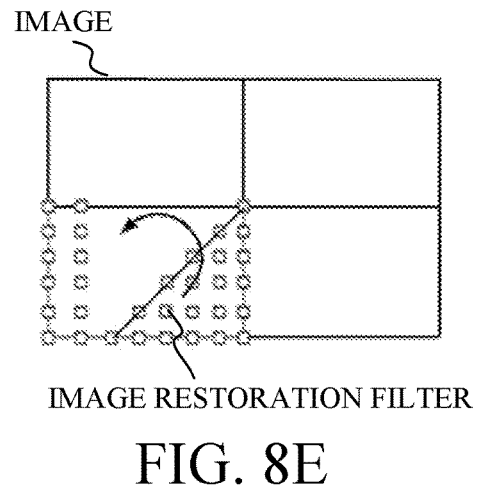
FIG. 8E

IMAGE PROCESSING APPARATUS, IMAGE PICKUP APPARATUS, IMAGE PROCESSING METHOD, AND STORAGE MEDIUM

BACKGROUND OF THE INVENTION

Field of the Invention

The present invention relates to an image processing apparatus that performs pixel increasing processing and image restoration processing for an image.

Description of the Related Art

The pixel increasing processing of increasing the number of pixels using pixel shift images has conventionally been known as processing of increasing the number of pixels of an image more than the number of pixels in an image sensor. Japanese Patent Laid-Open No. 2019-13046 ("JP") discloses an image processing method for generating a high-resolution combined image (pixel increased image) by combining a plurality of image data derived from the pixel shift. JP 2019-13046 discloses an image processing method for providing an edge enhancement to the combined image based on an MTF (modulation transfer function) characteristic of an imaging optical system.

In a case where the image restoration processing is performed for a pixel increased image by the image processing method disclosed in JP 2019-13046, the number of taps required for an image restoration filter necessary for the image restoration processing becomes large. For example, in a case where the image restoration filter is applied to a pixel increased image with the quadruple number of pixels in an attempt to correct blurs in the same range as that of the image restoration filter applied to an image obtained by imaging, a quadruple of the number of taps is necessary. Therefore, a data amount and a calculational amount increase in the case of image restoration processing for a pixel increased image.

SUMMARY OF THE INVENTION

The present invention provides an image processing apparatus, an image pickup apparatus, an image processing method, and a storage medium, each of which can reduce blurs caused by aberration and diffraction of an optical system while reducing a data amount and a calculational amount in pixel increasing processing and image restoration processing.

An image processing apparatus according to one aspect of the present invention includes at least one processor or circuit configured to execute a plurality of tasks including an image acquiring task configured to acquire a first image and a second image that have been obtained by imaging at imaging positions different from each other, an image restoration processing task configured to acquire a first restored image and a second restored image by performing image restoration processing for the first image and the second image respectively, and a pixel increasing processing task configured to acquire a pixel increased image using the first restored image and the second restored image. An image pickup apparatus including the above image processing apparatus, and an image processing method corresponding to the image processing method, and a storage medium storing a program for causing a computer to execute the above image processing method also constitute another aspect of the present invention.

Further features of the present invention will become apparent from the following description of exemplary embodiments with reference to the attached drawings.

BRIEF DESCRIPTION OF THE DRAWINGS

FIGS. 3A and 3B are explanatory diagrams of a point spread function ("PSF") in each embodiment.

FIG. 4 is an explanatory diagram of an amplitude component MTF and a phase component PTF (phase transfer function) of an optical transfer function ("OTF") in each embodiment.

FIGS. 8A to 8E are explanatory diagrams of a method of generating an image restoration filter according to the first embodiment.

DESCRIPTION OF THE EMBODIMENTS

Figure 1:
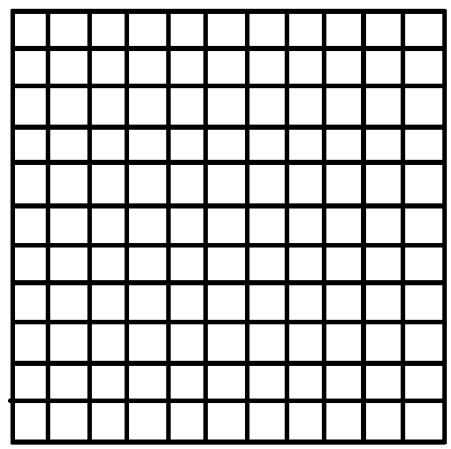
FIG. 1 is an explanatory diagram of an image restoration filter in each embodiment.

Referring now to the accompanying drawings, a detailed description will be given of embodiments according to the present invention.

A captured image obtained by the image pickup apparatus contains a blur component due to the influence of the aberration such as the spherical aberration, coma, curvature of field, and astigmatism of the imaging optical system, and thus is deteriorated. The blur component of the image caused by the aberration means a spread of a light beam emitted from one point of an object that should be converged on one point on an imaging plane in a case where there is no aberration and there is no influence of diffraction, and is represented by a point spread function ("PSF").

An optical transfer function ("OTF") obtained by Fourier-transforming the PSF is frequency component information on the aberration and is expressed by a complex number. An absolute value of the OTF, that is, an amplitude component is called MTF (Modulation Transfer Function), and a phase component is called PTF (Phase Transfer Function). The amplitude component MTF and the phase component PTF are frequency characteristics of the amplitude component and the phase component of image deteriorated by the aberration, respectively, and are expressed by the following expressions in which the phase component is expressed as a phase angle.

$$PTF = \tan^{-1}(Im(OTF)/Re(OTF))$$

where Re(OTF) and Im(OTF) are a real part and an imaginary part of the OTF, respectively. In this way, the OTF of the imaging optical system deteriorates the amplitude component MTF and the phase component PTF of the image, and each point of the object in the deteriorated image is asymmetrically blurred like the coma. A lateral chromatic aberration occurs when imaging positions shift due to the difference in the imaging magnification for each wavelength of light, and are acquired, for example, as an RGB color component according to the spectral characteristic of the image pickup apparatus. Thus, the imaging positions shift among RGB, and the image spreads due to the shift of the imaging positions for each wavelength in each color component, that is, the phase shift.

One conventional method of correcting the deteriorations of the amplitude component MTF and the phase component PTF uses the information on the OTF of the imaging optical system for the correction. This method is called by the terms the image restoration and image restoration, and processing of correcting the deterioration of a captured image using the information on the OTF of an imaging optical system will be referred to as image restoration processing hereinafter. Although the details will be described below, one of the known image restoration methods is a method of convolving an image restoration filter having an inverse characteristic of the OTF with an input image.

In order to effectively use the image restoration, it is necessary to obtain more accurate OTF information on the imaging optical system. The OTF of a general imaging optical system significantly varies depending on an image height (a position in an image). The OTF is two-dimensional data expressed by the complex number having a real part and an imaginary part. In the image restoration processing to a colored image having three color components of RGB, the OTF data at a single image height has the number of taps in the longitudinal direction×the number of taps in the lateral direction×2 (for the real part and the imaginary part)×3 (for RGB) where the number of taps is a length in the longitudinal or lateral direction of the OTF data. If the information is stored for all imaging conditions such as an image height, F-number (aperture value), zoom (focal length), and an imaging distance, an enormous data amount becomes necessary.

The pixel increasing processing is known as processing the number of pixels of an image more than the number of pixels in an image sensor. One conventional pixel increasing processing is a method of increasing the number of pixels using a pixel shift image.

A description will now be given of definitions of terms explained in each embodiment, the pixel increasing processing, and the image restoration processing (image processing method). The image processing method described here is used in each of the following embodiments as necessary.

Captured Image

A captured image is a digital image obtained by an image sensor that has received light via the imaging optical system, and is deteriorated by the OTF affected by the aberration of the imaging optical system including a lens and various optical filters. The imaging optical system may include a mirror having a curvature (reflective surface) in addition to a lens.

A color component of the captured image has, for example, information on the RGB color components. The color component can selectively use, a generally used color space such as lightness, hue, and saturation expressed by LCH, luminance expressed by YCbCr, and a color difference signal. Other color spaces can use XYZ, Lab, Yuv, and JCh. A color temperature may be used.

The captured image (input image) and output image can be accompanied by an imaging condition such as a focal length, an F-number, and an imaging distance of the lens, and various correction information for correcting the image. In a case where an image is sent from an image pickup apparatus to another image processing apparatus for correction processing, information on the imaging condition and corrections may be attached to the captured image as described above. The information on the imaging condition and corrections may be sent by directly or indirectly connecting the image pickup apparatus and the image processing apparatus to each other.

Image Restoration Processing

A description will now be given of an outline of the image restoration processing. The following expression (1) is satisfied:

$$g(x,y)=h(x,y)*f(x,y) \tag{1}$$

where g(x, y) is a captured image (deteriorated image), f(x, y) is an original image, h(x, y) is the PSF, which is a Fourier pair of the OTF, * is a convolution (convolution integral, sum of products), and (x, y) is a coordinate on the captured image.

The following expression (2) expressed by the product for each frequency is obtained by Fourier-transforming the expression (1) to convert it into the display format in terms of frequency:

$$G(u,v)=H(u,v) \cdot F(u,v) \tag{2}$$

where H is the OTF obtained by Fourier-transforming the PSF(h), G and F are functions obtained by Fourier-transforming the deteriorated image g and the original image f, respectively, and (u, v) is a coordinate on a two-dimensional frequency plane or a frequency.

In order to obtain the original image f from the captured deteriorated image g, both sides may be divided by the optical transfer function H as illustrated in the following expression (3):

$$G(u,v)/H(u,v)=F(u,v) \tag{3}$$

An inverse Fourier transform of F (u, v), that is, G(u, v)/H(u, v) to return it to a real surface can provide the original image f(x, y) as a restored image.

Where R is an inverse Fourier transform of H−1, the original image f(x, y) can be similarly obtained by performing the convolution processing for the image on the real surface as illustrated in the following expression (4):

$$g(x,y)*R(x,y)=f(x,y) \tag{4}$$

where R(x, y) is called an image restoration filter. In a case where the image is two-dimensional, the image restoration filter R is also generally a two-dimensional filter having taps (cells) each corresponding to a pixel in the image. The larger the number of taps (number of cells) of the image restoration filter R is, the higher the restoration accuracy generally becomes. The viable number of taps is set according to the required image quality, image processing ability, aberrational characteristics, and the like. The image restoration filter R needs to reflect at least the aberrational characteristic, and thus is different from the conventional edge enhancement filter having about three taps each in the horizontal and vertical directions. Since the image restoration filter R is set based on the OTF, both the deterioration of the amplitude component and the deterioration of the phase component can be corrected with high accuracy.

Since the actual image contains a noise component, the image restoration filter R created by a reciprocal of the OTF as described above may significantly increase the noise component in the restoration of the deteriorated image. This is because the MTF (amplitude component) of the optical system is amplified and returned to 1 over all frequencies while the amplitude component of the image contains the noise amplitude. The MTF, which is the amplitude deterioration by the optical system, can be returned to 1, but the power spectrum of the noise is simultaneously amplified, and the noise is consequently amplified according to the amplification degree of the MTF (restoration gain).

Thus, in the case where the noise is included, a good image for viewing cannot be obtained. This is expressed by the following expressions (5-1) and (5-2):

$$G(u,v)=H(u,v)\cdot F(u,v)+N(u,v) \quad (5\text{-}1)$$

$$G(u,v)/H(u,v)=F(u,v)+N(u,v)/H(u,v) \quad (5\text{-}2)$$

where N is the noise component.

For an image containing the noise component, there is a method of controlling the restoration degree according to an intensity ratio SNR between the image signal and the noise signal, such as the Wiener filter represented by the following expression (6):

$$M(u, v) = \frac{1}{H(u, v)} \frac{|H(u, v)|^2}{|H(u, v)|^2 + SNR^2} \quad (6)$$

where M(u, v) is a frequency characteristic of the Wiener filter, and |H(u, v)| is an absolute value (MTF) of the OTF. For each frequency, this method makes smaller the restoration gain (restoration degree) as the MTF becomes smaller, and makes larger the restoration gain as the MTF becomes larger. In general, the MTF of the imaging optical system is high on the low-frequency side and low on the high-frequency side, so this method substantially reduces the restoration gain on the high-frequency side of the image.

Figure 2:
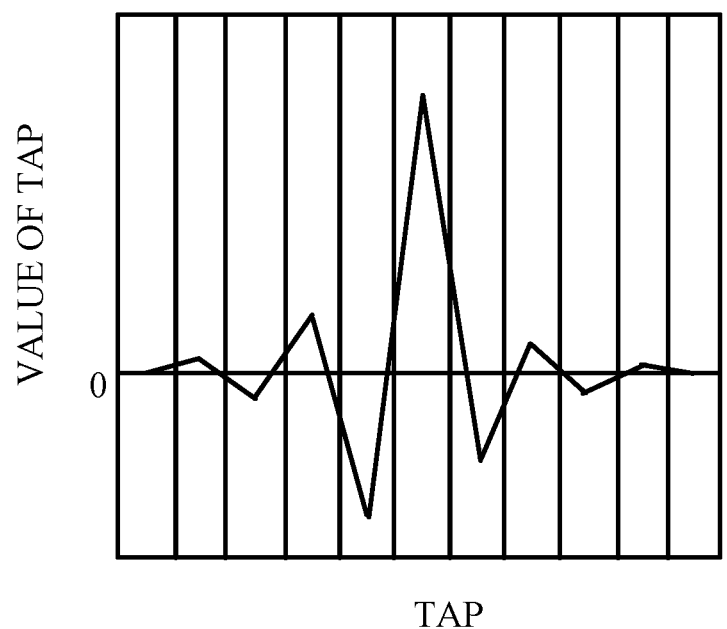
FIG. 2 is an explanatory view (sectional view) of the image restoration filter in each embodiment.

Referring now to FIGS. 1 and 2, a description will be given of the image restoration filter. FIG. 1 is an explanatory view of the image restoration filter. The number of taps of the image restoration filter is determined according to the aberrational characteristic of the imaging optical system and the required restoration accuracy. The image restoration filter illustrated in FIG. 1 is a two-dimensional filter having, for example, 11×11 taps. FIG. 1 omits each tap value (coefficient), but FIG. 2 illustrates one section of this image restoration filter. The distribution of the tap value (coefficient value) of the image restoration filter serves to ideally return to one original point the signal value (PSF) that has been spatially spread by the aberration.

Each tap of the image restoration filter undergoes convolution processing (convolution integration, sum of products) with each corresponding pixel in the image in the image restoration processing step. In order to improve the signal value at a predetermined pixel, the convolution processing accords that pixel with the center of the image restoration filter. The product of the signal value of the image and the coefficient value of the filter is taken for each corresponding pixel of the image and the image restoration filter, and the sum of the products is replaced with the signal value of the central pixel.

Referring now to FIGS. 3A, 3B, and 4, a description will be given of the characteristics of the image restoration in the real space and the frequency space. FIGS. 3A and 3B are explanatory views of the PSF, FIG. 3A illustrates the PSF before the image restoration is performed, and FIG. 3B illustrates the PSF after the image restoration is performed. FIG. 4 is an explanatory diagram of an amplitude component MTF (FIG. 4(M)) and a phase component PTF (FIG. 4(P)) of the OTF. A broken line (a) in FIG. 4(M) illustrates the MTF before the image restoration is performed, and an alternate long and short dash line (b) illustrates the MTF after the image restoration is performed. A broken line (a) in FIG. 4(P) illustrates the PTF before the image restoration is performed, and an alternate long and short dash line (b) illustrates the PTF after the image restoration is performed. As illustrated in FIG. 3A, the PSF before the image restoration is performed has an asymmetric spread, and this asymmetry causes the phase component PTF to have a nonlinear value against the frequency. Since the image restoration processing amplifies the amplitude component MTF and corrects the phase component PTF to be zero, the PSF after the image restoration is performed has a symmetrical and sharp shape.

The image restoration filter can be obtained by performing the inverse Fourier transform for a function designed based on the inverse function of the OTF of the imaging optical system. The image restoration filter for this embodiment can be properly changed, and for example, the Wiener filter as described above can be used. The Wiener filter when applied can create an image restoration filter in the real space that is actually convolved with the image, by performing the inverse Fourier transform for the expression (6).

Since the OTF affected by the aberration changes according to the image height (image position) of the imaging optical system even in a single imaging state, it is necessary to change the image restoration filter according to the image height.

On the other hand, the OTF affected by the diffraction, in which the influence becomes dominant as the F-number becomes larger, can be treated as a uniform OTF against the image height in a case where the influence of vignetting of the optical system is small.

In a case where the correction target of the image restoration processing does not contain the aberration but contains the diffraction (diffraction blur), the image restoration filter depends on the F-number and the wavelength of light, and does not depend on the image height (image position). Thus, a uniform (constant) image restoration filter can be used for a single image. The image restoration filter for correcting the diffraction blur is generated based on the OTF affected by the diffraction blur that is generated according to the F-number. Regarding the wavelength, the OTF is calculated for each of a plurality of wavelengths and generated for each color component by weighting each wavelength based on the spectroscopic spectrum of the assumed light source and the light receiving sensitivity information on the image sensor. Alternatively, the calculation may be performed using a predetermined representative wavelength for each color component. The image restoration filter can be generated based on the OTF for each color component.

Therefore, in the case where the diffraction is to be corrected, a plurality of image restoration filters depending on the F-number is stored in advance, and the image may be processed by a uniform (constant) image restoration filter according to the imaging condition of the F-number. An aperture deterioration component caused by the shape of the pixel aperture and a characteristic of the optical low-pass filter may be considered.

The above image restoration processing is also performed in a case where a phase mask (wavefront modulation element) for blunting the performance fluctuation in the depth direction is inserted into the optical system to expand the depth (WFC: WaveFront Coding). When the phase mask is inserted into the optical system to slow down the performance fluctuation in the depth direction, the performance fluctuation tends to be slowed down even for the imaging condition such as an image height and an object distance. In a case where the performance fluctuation against the image height is small when the phase mask is inserted into the optical system, a uniform OTF against the image height can be assumed similarly to the case of correcting the diffraction blur. Therefore, even in a case where the optical system includes a phase mask to expand the depth, a uniform (constant) image restoration filter may be used in a single image. The phase mask can use, for example, Cubic Phase Mask or the like whose surface shape is expressed by a cubic function. The phase mask that is used to expand the depth is not limited to the above, and various methods may be used.

Figure 5:
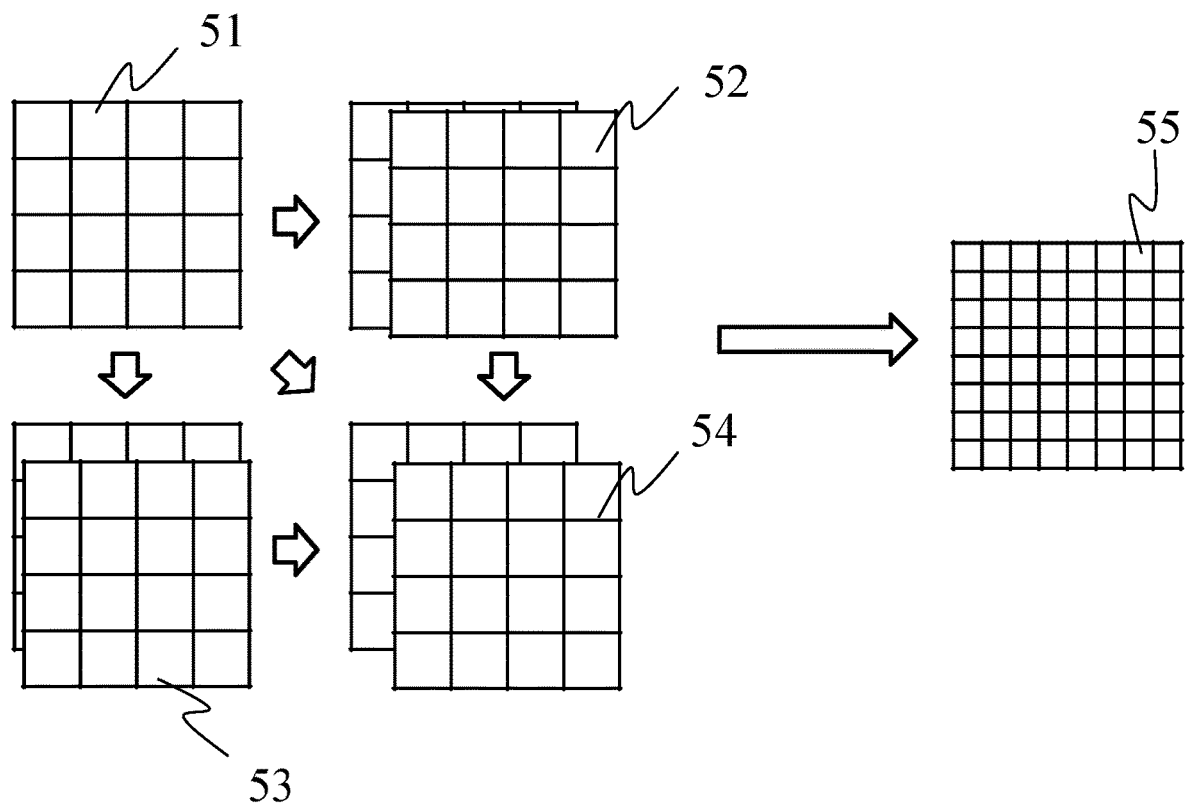
FIG. 5 is an explanatory diagram of pixel increasing processing according to each embodiment.

Referring now to FIG. 5, a description will be given of an outline of the pixel increasing processing. FIG. 5 is an explanatory diagram of the pixel increasing processing, and illustrates one example of a captured image for the pixel increasing processing. The pixel increasing processing acquires a pixel increased image from a plurality of captured images having different imaging positions. FIG. 5 acquires four captured images for the pixel increasing processing by imaging in a state where the imaging positions are shifted by half a pixel from each other. Each of the four captured images was acquired by a reference state 51 (no shift), a horizontal shift 52, a vertical shift 53, and a horizontal and vertical shift 54. Acquiring four captured images that are shifted by half a pixel can provide a pixel increased image 55 in which the number of pixels is quadrupled by the pixel increasing processing. The method of shifting the imaging position may be performed by shifting the image sensor, or by moving the optical system, part of the lenses included in the optical system, or the entire image pickup apparatus.

FIG. 5 illustrates an example in which the image sensor is a monochrome sensor. In a case where the image sensor has a Bayer array, a plurality of captured images shifted by one pixel may be acquired and then a plurality of captured images shifted by half a pixel. By shifting the image sensor by one pixel while the image sensor has a Bayer array, a luminance value of each color can be accurately acquired for each pixel without demosaicing processing by interpolation processing.

Figure 6:
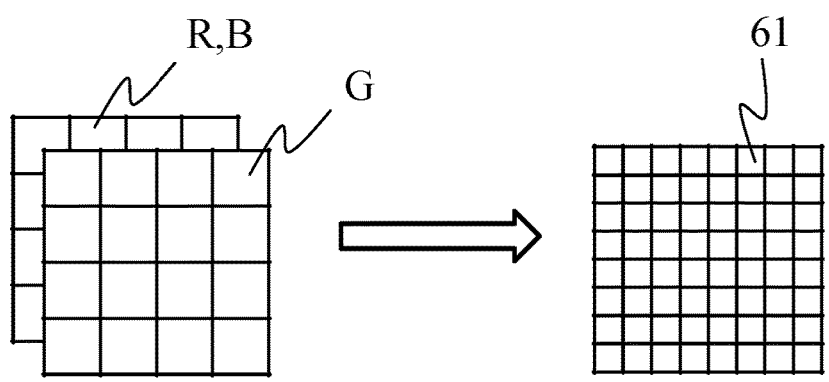
FIG. 6 is an explanatory diagram of other pixel increasing processing according to each embodiment.

FIG. 6 is an explanatory diagram of other pixel increasing processing, and illustrates an example of acquiring a plurality of images for the pixel increasing processing by using a plurality of image sensors. For example, during imaging using different image sensors for RGB, the imaging position of G is shifted by half a pixel relative to the imaging positions of R and B, so that the captured image for the pixel increasing processing is acquired. Then, the pixel increasing processing by the interpolation processing can provide a pixel increased image 61 having the number of pixels larger than that of the captured image. The pixel increasing processing and the image capturing for the pixel increasing processing are not limited to the above example, and other methods may be used.

First Embodiment

Figure 7:
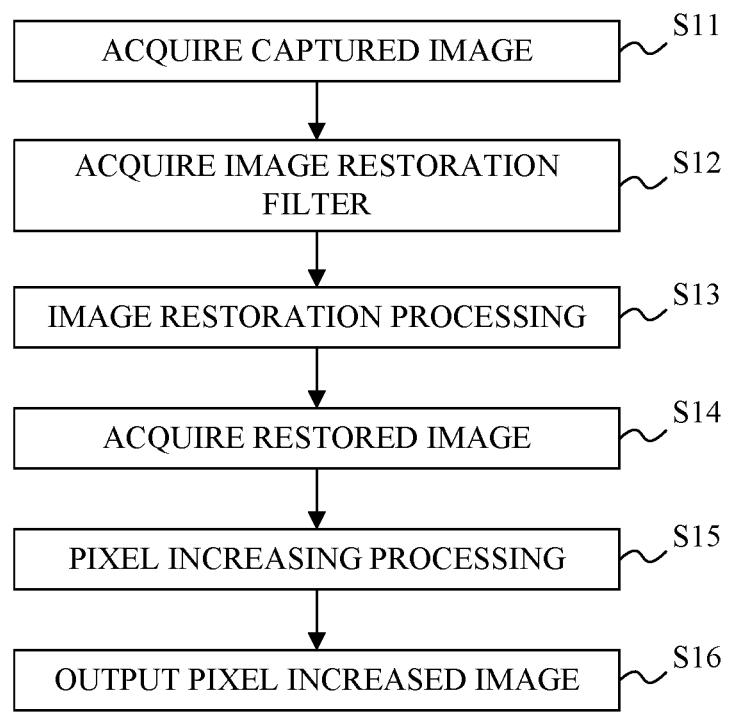
FIG. 7 is a flowchart of an image processing method according to a first embodiment.

Referring now to FIG. 7, a description will be given of an image processing method according to a first embodiment of the present invention. FIG. 7 is a flowchart of an image processing method (image processing program) according to this embodiment. The image processing method according to this embodiment is executed by a computer that includes a CPU or the like (at least one processor or circuit) as an image processing apparatus according to the image processing program serving as a computer program. This is also applicable to other embodiments described below.

First, in the step S11, the image processing apparatus acquires a captured image generated by the image pickup apparatus through imaging. The captured image may be acquired from the image pickup apparatus via a wired or wireless communication between the image pickup apparatus and the image processing apparatus, or may be performed via a storage medium such as a semiconductor memory or an optical disc. In acquiring the captured image, images are acquired having imaging positions that shift from each other for the pixel increasing processing described below. As described above, in capturing an image for the pixel increasing processing can be performed with various methods. As an example, this embodiment acquires four images as captured images captured with the imaging positions shifted by half a pixel from each other (in a reference state, with a horizontal shift, with a vertical shift, with horizontal and vertical shifts).

Next, in the step S12, the image processing apparatus acquires an image restoration filter for the image restoration processing described below. This embodiment will discuss an example of acquiring aberration information (optical information) based on the imaging condition and of acquiring the image restoration filter based on the aberration information. This embodiment generates the image restoration filter based on the optical information on the imaging optical system.

First, the image processing apparatus acquires the imaging condition (imaging condition information) that is used for the image pickup apparatus to generate the captured image by imaging. As described above, the imaging condition includes a focal length, an F-number (aperture value), and an imaging distance of the imaging optical system, and identification information (camera ID) of the image pickup apparatus. In the image pickup apparatus in which the imaging optical system is interchangeable, the identification information (lens ID) of the imaging optical system (interchangeable lens) may be included in the imaging condition. The imaging condition information may be acquired as information attached to the captured image as described above, or may be acquired via a wired or wireless communication or a storage medium.

Next, the image processing apparatus acquires aberration information suitable for the imaging conditions. In this embodiment, the aberration information is the OTF. The image processing apparatus selects and acquires a proper OTF according to the imaging condition from a plurality of OTFs stored in advance. In a case where the imaging condition such as the F-number, the imaging distance, and the focal length of the zoom lens is a specific imaging condition, the OTF corresponding to the imaging condition can be generated through interpolation processing using the OTFs of other imaging conditions. In this case, it is possible to reduce a data amount of the OTF to be stored. The interpolation processing can use, but is not limited to, bilinear interpolation (linear interpolation), bicubic interpolation, and the like.

In this embodiment, the image processing apparatus acquires the OTF for the aberration information, but is not limited to this example. Instead of the OTF, aberration information such as the PSF may be acquired. In this embodiment, the image processing apparatus may acquire coefficient data approximated by fitting aberration information to a predetermined function, and may reconstruct the OTF or the PSF from the coefficient data. For example, the OTF may be fitted using a Legendre polynomial, or another function such as a Chebyshev polynomial.

In this embodiment, the image processing apparatus generates a plurality of OTFs in one direction that passes through the image (or screen) center (the center of the captured image) or the optical axis of the imaging optical system. The imaging optical system may include an image pickup apparatus, an optical low-pass filter, and the like.

Next, the image processing apparatus expands the OTFs by rotating the OTFs about the center of the image (screen) center (the center of the captured image) or the optical axis of the imaging optical system. More specifically, the image processing apparatus discretely disposes the OTF at a plurality of positions in the captured image by interpolating the OTF corresponding to the pixel arrangement.

Next, the image processing apparatus converts the OTF into an image restoration filter, that is, and generates the image restoration filter using the expanded OTF. The image restoration filter is generated by creating a restoration filter characteristic in a frequency space based on the OTF and by converting it into a filter in the real space (image restoration filter) by the inverse Fourier transform.

FIGS. 8A to 8E are explanatory diagrams of a method of generating the image restoration filter. As illustrated in FIG. 8A, the OTFs are arranged in a circumscribed circle area (imaging area) of the image and aligned with one direction (vertical direction) passing through the image center (center of the captured image) or the optical axis of the imaging optical system.

This embodiment expands the OTF on a straight line as illustrated in FIG. 8A, but the present invention is not limited to this example. For example, assume in the captured image plane, a first straight line (y-axis in FIG. 8A) and a second straight line (x-axis in FIG. 8A) are straight lines that pass through the center of the captured image or the optical axis of the imaging optical system and are orthogonal to each other. At this time, at least two of the acquired OTFs may be OTFs corresponding to positions (image heights) on the first straight line. That is, as long as the OTFs are arranged at a plurality of positions (multiple positions in the captured image) at different distances from the image center or the optical axis of the imaging optical system in a predetermined direction, the OTFs does not have to be linearly aligned with one direction. In a case where there is no pixel including the center of the captured image or the optical axis of the imaging optical system, that is, in a case where the center of the captured image or the optical axis of the imaging optical system is located between pixels, the acquired OTFs may be OTFs corresponding to the positions (image heights) of the pixels sandwiching the first straight line.

In a case where the OTFs are aligned with one direction, the direction is not limited to the vertical direction and may be another direction such as the horizontal direction. The OTF may be disposed linearly in either the vertical direction or the horizontal direction because the image processing according to this embodiment can be easily performed.

Next, the OTFs are rotated, the interpolation processing (various processing according to the rotated pixel arrangement) is performed as necessary, and the OTFs are rearranged as illustrated in FIG. 8B. The interpolation processing includes interpolation processing in the radial direction and interpolation processing along with the rotation, and the OTFs can be rearranged at arbitrary positions. Next, for the OTF at each position, the frequency characteristic of the image restoration filter is calculated as illustrated in the expression (6) and the inverse Fourier transform is performed for the conversion into the image restoration filter in the real space as illustrated in FIG. 8C.

In the captured image, assume that the first straight line (y-axis in FIG. 8A) and the second straight line (x-axis in FIG. 8A) are straight lines that pass through the center of the captured image or the optical axis of the imaging optical system and are orthogonal to each other. A second area (81 in FIG. 8C) is an area point-symmetrical to a first area (83 in FIG. 8C) of the captured image with respect to the center of the captured image or the optical axis OA of the imaging optical system. A third area (82 in FIG. 8C) is an area line-symmetrical to the first area with respect to the first straight line, and a fourth area (84 in FIG. 8C) is an area line-symmetrical to the first area with respect to the second straight line. The OTFs of the second area, the third area, and the fourth area are generated by using the OTF of the first area. Thereby, the Fourier transform processing is reduced down to approximately a quarter of the final rearrangement area. If the OTFs of FIG. 8B and the image restoration filter of FIG. 8C are rearranged by the rotations and interpolation processing as illustrated in FIG. 8E and expanded as illustrated in FIG. 8D using symmetry, the Fourier transform processing can be made simpler. The arrangements illustrated in FIGS. 8A to 8E (deposition density of the restoration filter) are merely illustrative, and the arrangement interval can be arbitrarily set according to the fluctuation of the OTF of the imaging optical system.

This embodiment assumes that the OTFs are rotationally symmetric with respect to the center of the imaging plane (screen center) or the optical axis of the imaging optical system, and rotates and expands the OTFs aligned with one direction passing through the image center or the optical axis of the imaging optical system described above. Thereby, the image restoration processing can be performed with a small data amount. In a case where the correction target of the image restoration processing is a blur that does not include the aberration or depend on the image height (image position) such as the diffraction (diffraction blur), OTFs that are uniform (constant) in a single image or an image restoration filter that is uniform (constant) in a single image may be used.

The image restoration filter acquired in the step S12 above is applied to the captured image in the step S13 described below. Therefore, ideal image restoration processing is difficult at a frequency higher than the Nyquist frequency generated by the pixel increasing processing described below. A signal having a frequency higher than the Nyquist frequency is folded within the Nyquist frequency when the image restoration processing is performed for the captured image, and the restoration gain at the frequency of the folded destination is applied.

Figure 9:
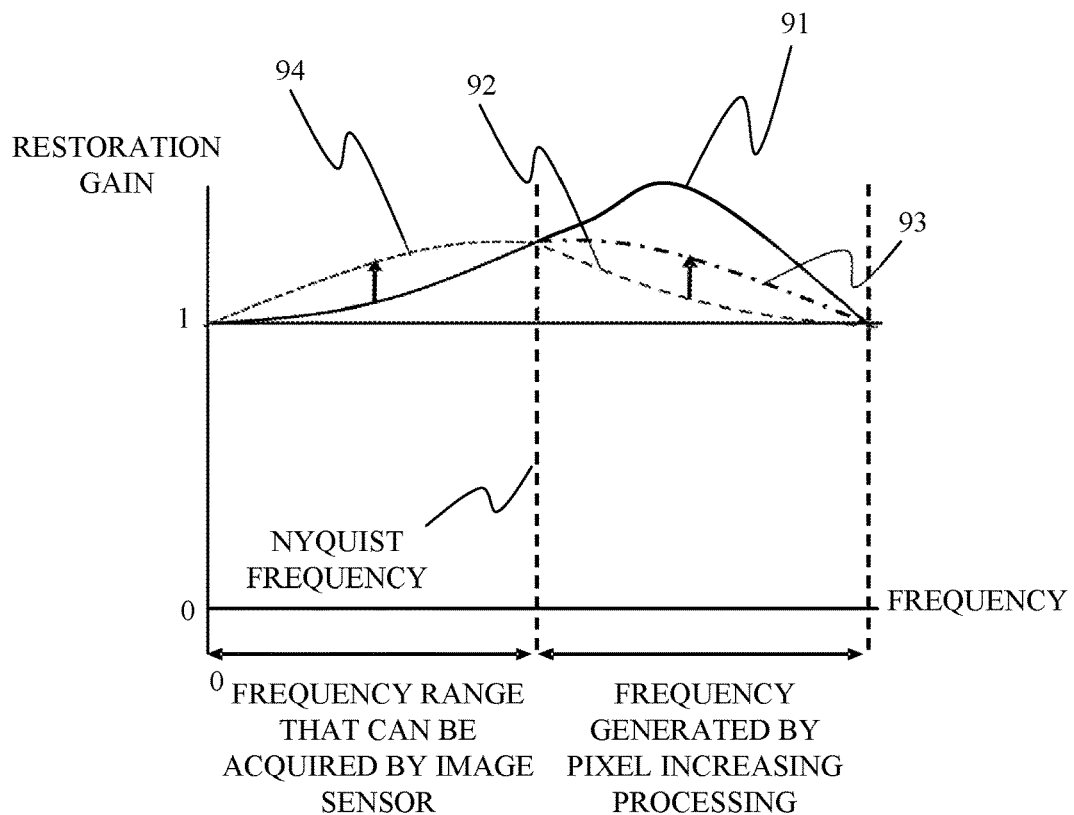
FIG. 9 is an explanatory diagram of a restoration gain of the image restoration filter according to the first embodiment.

FIG. 9 is an explanatory diagram of the restoration gain and the ideal restoration gain in the image restoration processing for the captured image. In FIG. 9, a horizontal axis denotes a frequency and a vertical axis denotes a restoration gain. The frequency on the horizontal axis illustrates a frequency up to twice the Nyquist frequency, a front half range illustrates a frequency band up to the Nyquist frequency, and a next half range illustrates a frequency band generated by the pixel increasing processing. Regarding an ideal restoration gain 91 in a state including frequencies higher than the Nyquist frequency generated by the pixel increasing processing, the restoration gain up to the Nyquist frequency is applied in the image restoration processing for the captured image. That is, a restoration gain 92 at a frequency of the folded destination within the Nyquist frequency is applied to a signal having a frequency higher than the Nyquist frequency. It is therefore difficult to apply the ideal restoration gain for frequencies higher than the Nyquist frequency generated by the pixel increasing processing.

Accordingly, the restoration gain of the image restoration filter is set based on the restoration characteristic at frequencies lower than the Nyquist frequency and the restoration characteristic at frequencies higher than the Nyquist frequency. The image restoration filter is generated based on the restoration characteristic at frequencies lower than the Nyquist frequency and the restoration characteristic at frequencies higher than the Nyquist frequency.

FIG. 9 illustrates an example of setting the restoration gain. For example, a restoration gain 94 is set so that an average or weighted average restoration gain 93 of the ideal restoration gain 91 at frequencies higher than the Nyquist frequency and the restoration gain 92 at frequencies lower than the Nyquist frequency applied to the frequencies higher than the Nyquist frequency is applied to frequencies higher than the Nyquist frequency. More specifically, the restoration gain 94 is set by calculating a ratio of the restoration gain 92 lower than the Nyquist frequency applied to frequencies higher than the Nyquist frequency and the average restoration gain 93, and by applying a value obtained by folding back the ratio to the restoration gain within the Nyquist frequency (as illustrated by an arrow). The image restoration filter is generated based on the OTF at a frequency lower than the Nyquist frequency and the OTF (folded OTF) at a frequency higher than the Nyquist frequency. Thereby, a signal at a frequency higher than the Nyquist frequency generated by the pixel increasing processing can be made closer to the ideal image restoration processing.

Alternatively, a target MTF for the image restoration processing may be set, and an image restoration filter may be generated based on the target MTF. For example, a diffraction limit MTF, etc. at a predetermined F-number is set as the target MTF. In a case where the target MTF has a high value even after the Nyquist frequency, the target MTF significantly differs depending on the assumed object. Where it is assumed that an object such as a periodic structure at a specific frequency, the target MTF can be simply considered because there is no sampling folding influence, but for an object that includes high-frequency components higher than the Nyquist frequency, it is necessary to consider folding of the target MTF due to the folding influence. That is, the target MTF changes depending on the assumed object. In a case where the image restoration filter is generated so as to provide the target MTF in which an object that is not subject to the folding influence is assumed, proper image restoration processing can be performed for an object like a periodic structure at a specific frequency, but the undercorrection occurs for an object including a high frequency because the target MTF is unavailable. In a case where the image restoration filter is generated so as to provide the target MTF in which an object including a high frequency is assumed, the overcorrection occurs beyond the target MTF for an object like a periodic structure at a specific frequency. Thus, in the case where there is a discrepancy between the assumed object setting the target MTF and the object to be processed by the image restoration processing, the undercorrection or the overcorrection may occur.

Figure 10:
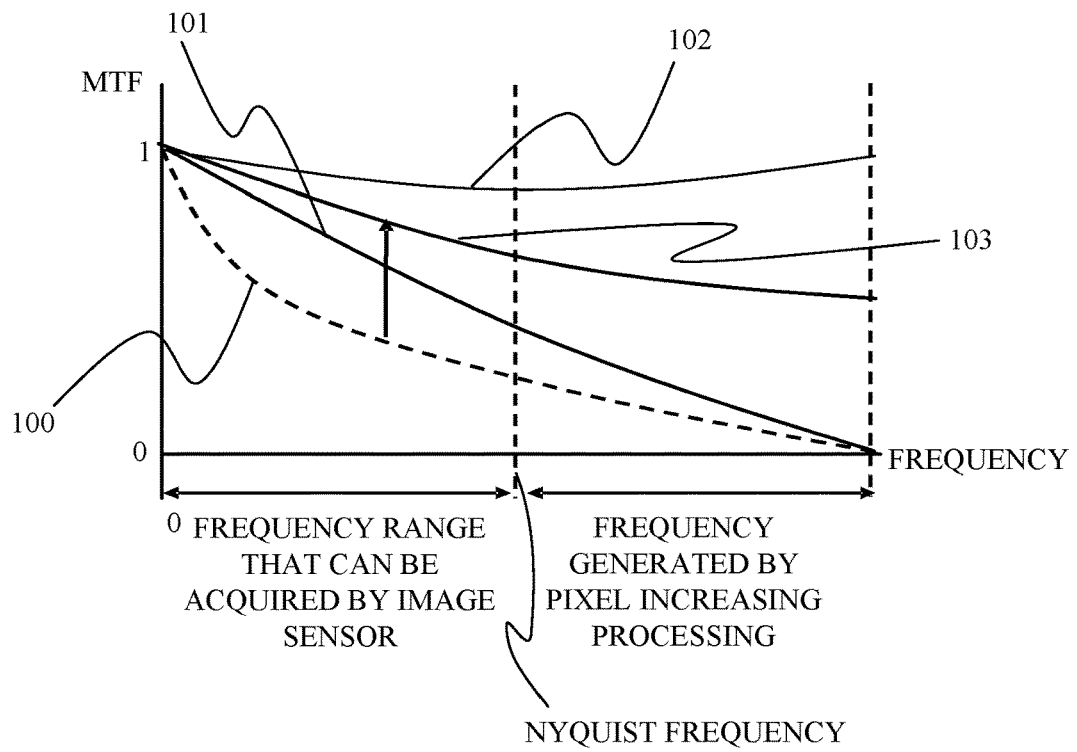
FIG. 10 is an explanatory diagram of a target MTF in generating the image restoration filter according to the first embodiment.

Accordingly, the target MTF is determined based on the OTF at a frequency lower than the Nyquist frequency and the OTF at a frequency higher than the Nyquist frequency, and the image restoration filter is generated. That is, the target MTF 15 determined based on the target MTF at a frequency lower than the Nyquist frequency that is not to be folded and the target MTF where the OTF at a frequency higher than the Nyquist frequency is folded, and the image restoration filter is generated. FIG. 10 is an explanatory diagram of the target MTF in generating the image restoration filter. For example, as illustrated in FIG. 10, an image restoration filter is generated by setting to the target MTF an average or weighted average MTF 103 of a target MTF 101 at a frequency lower than the Nyquist frequency that is not to be folded and a target MTF 102 where the OTF at a frequency higher than the Nyquist frequency is folded. That is, an image restoration filter is generated that restores an MTF 100 that has deteriorated by the aberration or the like up to the target MTF 103 (as indicated by an arrow). Thereby, in the case where the target MTF is set, the undercorrection or overcorrection can be relaxed.

The generation and acquisition of the image restoration filter has been described above, but the present invention is not limited to this example. For instance, an image restoration filter may be generated and stored in advance, and may be selected and acquired based on the imaging condition.

Next, in the step S13 of FIG. 7, the image processing apparatus performs the image restoration processing for the captured image acquired in the step S11. The image restoration processing is performed based on the image restoration filter acquired in the step S12. Since the captured image includes a plurality of captured images having different imaging positions, the center of the image shifts from the optical axis (correction center). Therefore, the image restoration processing may be performed by shifting the correction center according to the imaging position of the captured image to be restoreed.

In the convolution of the image restoration filter, the pixels at positions other than those where the image restoration filter is illustrated in FIG. 8D are disposed can be generated through interpolation using a plurality of filters near them. At this time, the image restoration filter includes a first image restoration filter at a first position of the captured image, and a second image restoration filter at a second position of the captured image. The first image restoration filter is generated with the expanded OTFs. The second image restoration filter is generated through interpolation using the first image restoration filter. The interpolation processing can change, for example, the image restoration filter for each pixel.

Next, in the step S14, the image processing apparatus acquires a plurality of restored images made by performing the image restoration processing for the plurality of captured images acquired by imaging at shifted imaging positions. The plurality of restored images are acquired by the image restoration processing based on the image restoration filter to the plurality of captured images obtained by imaging at shifted imaging positions in the step S11. The plurality of restored images may be acquired by the image restoration processing after the plurality of captured images are obtained or the plurality of restored images may be acquired by repeating acquiring one image by imaging at a shifted imaging position and then performing the image restoration processing to acquire the restored image.

Next, in the step S15, the image processing apparatus performs the pixel increasing processing using the plurality of restored images acquired in the step S14. The pixel increasing processing can be performed by using various methods as described above.

Next, in the step S16, the image processing apparatus outputs as an output image the pixel increased image obtained by the pixel increasing processing. The image processing apparatus may perform various processing relating to development processing for the pixel increased image.

The pixel increased image obtained by the above flow is an image in which blurs caused by the aberration and diffraction are reduced by the image restoration processing, and the number of pixels is larger than the number of pixels of the image sensor. This embodiment has discussed the processing based on the inverse function of the OTF as the image restoration processing for correcting the deterioration in the image, but the unsharp mask processing using the aberration information is similarly applicable. The unsharp mask processing generates a sharpened image by adding or subtracting to and from the original image a difference between the original image and an unsharp image blurred by applying the unsharp mask to the original image. The PSF of the imaging optical system that is used as an unsharp mask can provide an image in which the deterioration caused by the aberration of the imaging optical system during imaging is corrected.

A corrected image f(x, y) can be expressed by the following expression (7):

$$f(x,y)=g(x,y)+m \times u(x,y) \quad (7)$$

where g(x, y) is a captured image and u(x, y) is a correction component.

In the expression (7), the degree of restoration (restoration gain) of the correction component u(x, y) against the captured image g(x, y), that is, the correction amount is adjustable by changing a value of m. The value of m may be changed according to the image height (position of the image) of the imaging optical system, or may be a constant value.

The correction component u(x, y) is expressed by the following expression (8):

$$u(x,y)=g(x,y)-g(x,y)*PSF(x,y) \quad (8)$$

The correction component u(x, y) can be expressed by the following expression (9) by transforming the right side of the expression (8):

$$u(x,y)=g(x,y)*(\delta(x,y)-PSF(x,y)) \quad (9)$$

where δ is a delta function (ideal point image). The delta function that is used herein has the same number of taps as that of the PSF(x, y), the central tap has a value of 1, and all other taps have values of 0.

From the expressions (7) to (9), the corrected image f(x, y) can be expressed by the following expression (10):

$$f(x,y)=g(x,[\delta(x,y)+m \times (\delta(x,y)-PSF(x,y))] \quad (10)$$

The unsharp mask processing can be performed by convolving the portion in the curly brace [ ] in the expression (10) as a filter (image restoration filter) with the captured image g(x, y).

The PSF changes according to the image height (image position) of the imaging optical system even in a single imaging state. Therefore, the filter of the unsharp mask processing to be used is also changed according to the image height. Various resolution improving processing, such as super-resolution processing using the aberration information, can be similarly applied.

Second Embodiment

Figure 11:
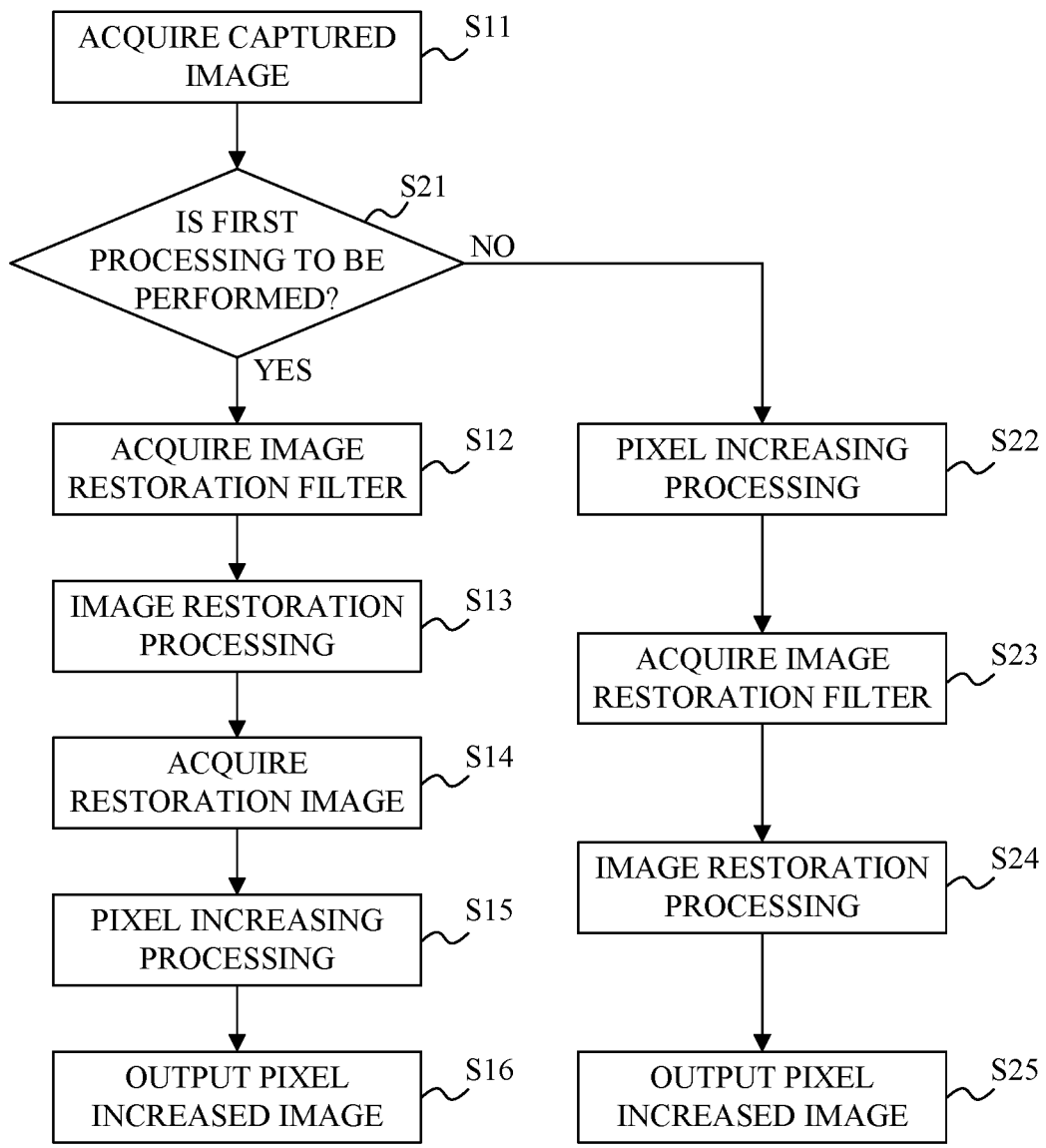
FIG. 11 is a flowchart of an image processing method according to a second embodiment.

Referring now to FIG. 11, a description will be given of an image processing method according to a second embodiment of the present invention. FIG. 11 is a flowchart of an image processing method according to this embodiment. In the first embodiment, the captured image receives the image restoration processing and then the restored image is used for the pixel increasing processing. This embodiment includes a flow to perform the pixel increasing processing for the captured image according to various conditions, and then to perform the image restoration processing. The image processing method according to this embodiment is executed by a computer according to an image processing program and the flowchart illustrated in FIG. 11. In FIG. 11, the steps S11 to S16 are the same as those in the first embodiment (FIG. 7), and thus a description thereof will be omitted.

In the step S21, the image processing apparatus determines whether or not to perform the first processing. In a case where the image processing apparatus performs the first processing, the image restoration processing and the pixel increasing processing are performed based on the flowchart of the first embodiment (FIG. 7). On the other hand, in a case where the image processing apparatus does not perform the first processing, the flow proceeds to the step S22. In the flow subsequent to the step S22, the image restoration processing is performed after the pixel increasing processing is performed using the captured image (second processing).

The processing of determining whether or not to perform the first processing is based on, for example, the restoration target data. In a case where the restoration target data is a moving image, the first processing is performed, and in a case where the restoration target data is a still image or a still image cut out from the moving image, the second processing is performed. In the case where the restoration target data is a moving image, the use of the image restoration filter with a small number of taps can reduce a data amount and a calculational amount, prioritize a processing speed. When the restoration target is a still image, the image restoration processing can handle the high frequency generated by the pixel increasing processing although a relatively long processing time is necessary. Alternatively, whether or not to perform the first processing may be determined based on an imaging mode such as a moving image mode or a still image mode.

The image processing apparatus may determine whether or not to perform the first processing based on the PSF or the OTF. For example, in a case where the size (spread) of the PSF is larger than a predetermined value, the first processing is performed, and in a case where it is smaller, the second processing is performed. When the PSF is large, the first processing is performed in which the image restoration filter with a small number of taps can perform the restoration processing, and when the PSF is small, the second processing is performed. The size of the PSF may be a half width of the PSF, or may be determined within a range including a predetermined ratio of the PSF (such as 95% of the total), etc.

Alternatively, the image processing apparatus may determine whether or not to perform the first processing based on the OTF at a frequency higher than the Nyquist frequency. For example, in a case where the MTF is smaller than a threshold at a predetermined frequency equal to or higher than the Nyquist frequency, the first processing is performed, and in a case where the MTF is larger than the threshold at the predetermined frequency, the second processing is performed. The predetermined frequency equal to or higher than the Nyquist frequency is, for example, the Nyquist frequency, and whether or not the first processing is performed is determined based on the MTF at the Nyquist frequency. Thereby, in a case where the MTF is larger than the Nyquist frequency, the image restoration processing is performed after the pixel increasing processing is performed, so that proper image restoration processing is performed for the high frequency generated by the pixel increasing processing. On the other hand, when the MTF is smaller than the Nyquist frequency, efficient image restoration processing is available with a reduced data amount and a reduced calculational amount by performing the first processing.

The image processing apparatus may determine whether or not to perform the first processing based on the F-number. For example, the image processing apparatus performs the first processing in a case where the F-number is larger than a predetermined F-number, and performs the second processing in a case where the F-number is smaller than the predetermined F-number. As the F-number increases, the diffraction blur increases and the high-frequency MTF tends to decrease. Therefore, in the case where the F-number is large, the first processing is performed that can perform the restoration processing even with an image restoration filter with a small number of taps, and in the case where the F-number is small, the second processing is performed which can provide proper image restoration processing to a high frequency generated by the pixel increasing processing. This processing determining method may be adopted, for example, in a case where an aberration amount is smaller than a predetermined amount. Where the F-number is small, the aberrational influence becomes dominant and the PSF tends to be large. Thus, the image processing apparatus may perform the first processing where the F-number is smaller than the predetermined F-number, and perform the second processing where the F-number is larger than the predetermined F-number. This processing determining method may be adopted where an aberrational amount is larger than a predetermined amount.

Next, in the step S22, the image processing apparatus performs the pixel increasing processing using the plurality of captured images acquired in the step S11. As described above, various methods can be used for pixel increasing processing.

Next, in the step S23, the image processing apparatus acquires an image restoration filter for the image restoration processing described below. Similar to the first embodiment, this embodiment also acquires the aberration information based on the imaging condition and the image restoration filter based on the aberration information, but may acquire the image restoration filter that has been previously stored. The image restoration filter acquired in the second processing is an image restoration filter that can restore a frequency higher than the Nyquist frequency generated by the pixel increasing processing, and is different from the image restoration filter acquired in the step S12 of the first processing. The image restoration filter acquired in the first processing has the number of taps smaller than that of the image restoration filter acquired in the second processing.

Next, in the step S24, the image processing apparatus performs the image restoration processing for the image obtained by the pixel increasing processing in the step S22 using the image restoration filter acquired in the step S23, and acquires a restoreed pixel increased image. Next, in the step S25, the image processing apparatus outputs the restoreed pixel increased image as an output image. At this time, the image processing apparatus may perform various processing relating to the development processing for the pixel increased image.

The pixel increased image obtained by the above flow is an image in which blurs caused by the aberration and diffraction are reduced by the image restoration processing, and the number of pixels is larger than the number of pixels of the image sensor. This embodiment can perform effective processing according to various conditions by properly determining whether the first processing or the second processing is to be performed according to various conditions.

Third Embodiment

Figure 12:
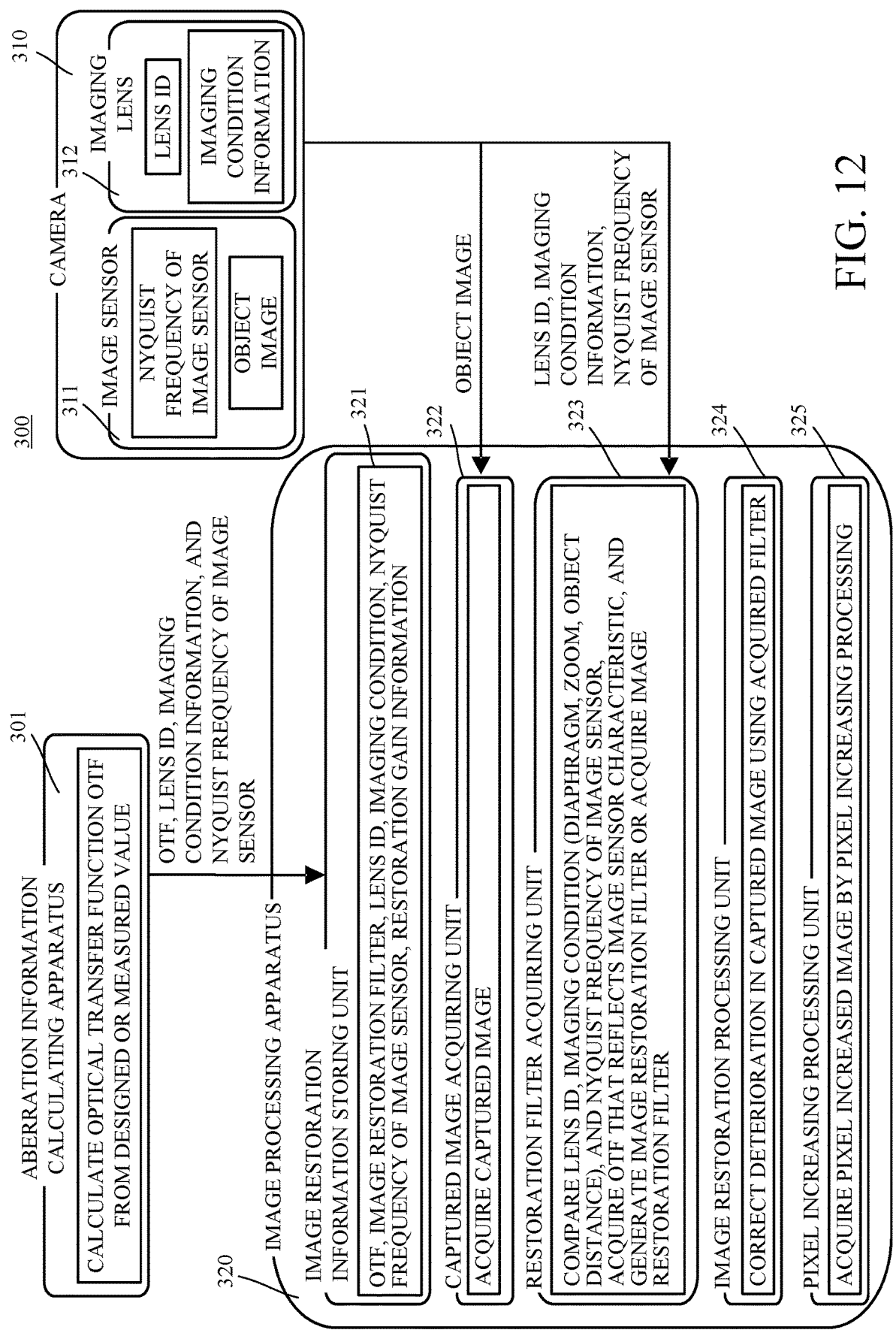
FIG. 12 is an explanatory diagram of an image processing system according to a third embodiment.

Referring now to FIG. 12, a description will be given of an image processing system including an image processing apparatus that performs the above image processing method. FIG. 12 is an explanatory diagram of the image processing system 300 according to this embodiment. The image processing system 300 includes an aberration information calculating apparatus 301, a camera (image pickup apparatus) 310, and an image processing apparatus 320.

The aberration information calculating apparatus 301 performs processing of calculating the OTF from a designed or measured value of the imaging optical system according to the imaging condition of the captured image. The camera 310 includes an image sensor 311 and an imaging lens 312. The camera 310 attaches the lens ID of the imaging lens 312, imaging condition information (F-number, zoom, imaging distance, etc.) and the Nyquist frequency of the image sensor 311 to the image captured by the imaging lens 312, and outputs the image.

The image processing apparatus 320 includes an image restoration information storing unit 321, a captured image acquiring unit (image acquiring unit or task) 322, a restoration filter acquiring unit 323, an image restoration processing unit 324, and a pixel increasing processing unit 325. In a case where the image processing apparatus 320 performs processing according to the flow of the second embodiment, it further includes a processing determining unit. The image processing apparatus 320 stores the information output from the aberration information calculating apparatus 301 and the camera 310, and corrects a deteriorated image captured by the imaging lens 312 using the information (performing the image restoration processing of the captured image).

The image restoration information storing unit 321 stores information on an OTF, the number of taps, lens ID, an imaging condition, and a Nyquist frequency of the image sensor for each of the various combinations of the imaging lens 312 and the image sensor 311 calculated by the aberration information calculating apparatus 301. Thus, the image restoration information storing unit 321 is a memory (storage unit) for storing the OTF according to the imaging condition of the captured image. Alternatively, an image restoration filter may be generated and retained instead of the OTF. The captured image acquiring unit 322 acquires a captured image from the camera 310.

The restoration filter acquiring unit 323 acquires the Nyquist frequency information on the image sensor 311 and the captured image from the camera 310, and acquires the lens ID of the imaging lens 312 and the imaging condition information. The restoration filter acquiring unit 323 searches for the OTF stored in the image restoration information storing unit 321 based on the lens ID of the camera 310 and the imaging condition that is used when the photographer captured an image. Then, the restoration filter acquiring unit 323 acquires the corresponding OTF (OTF suitable for the lens ID and the imaging condition during imaging). The restoration filter acquiring unit 323 acquires the OTF that is used by the restoration filter acquiring unit 323 in the spatial frequency range up to the Nyquist frequency of the image sensor in the camera 310. The restoration filter acquiring unit 323 acquires the OTF of the imaging optical system (imaging lens 312) according to the position of the captured image by using the acquired OTF. The restoration filter acquiring unit 323 is an OTF acquiring unit that acquires the OTF of the imaging optical system according to the position of the captured image. The restoration filter acquiring unit 323 is an OTF expanding unit that expands the OTFs by rotating the OTFs about the center of the captured image or the optical axis OA of the imaging optical system. The restoration filter acquiring unit 323 generates an image restoration filter that corrects the deterioration in the captured image using the acquired OTF. In a case where the image restoration information storing unit 321 stores the image restoration filter, the restoration filter acquiring unit 323 acquires the image restoration filter.

The image restoration processing unit 324 corrects the deterioration in the image using the acquired image restoration filter. The pixel increasing processing unit 325 performs the pixel increasing processing using a plurality of images having imaging positions that shift from each other, and acquires a pixel increased image.

If the OTF previously calculated by the aberration information calculating apparatus 301 is stored in the image restoration information storing unit 321, it is unnecessary to provide the aberration information calculating apparatus 301 to the user (photographer). The user can also download and use information necessary for the image restoration processing, such as coefficient data, through a network or various storage media.

Fourth Embodiment

Figure 13:
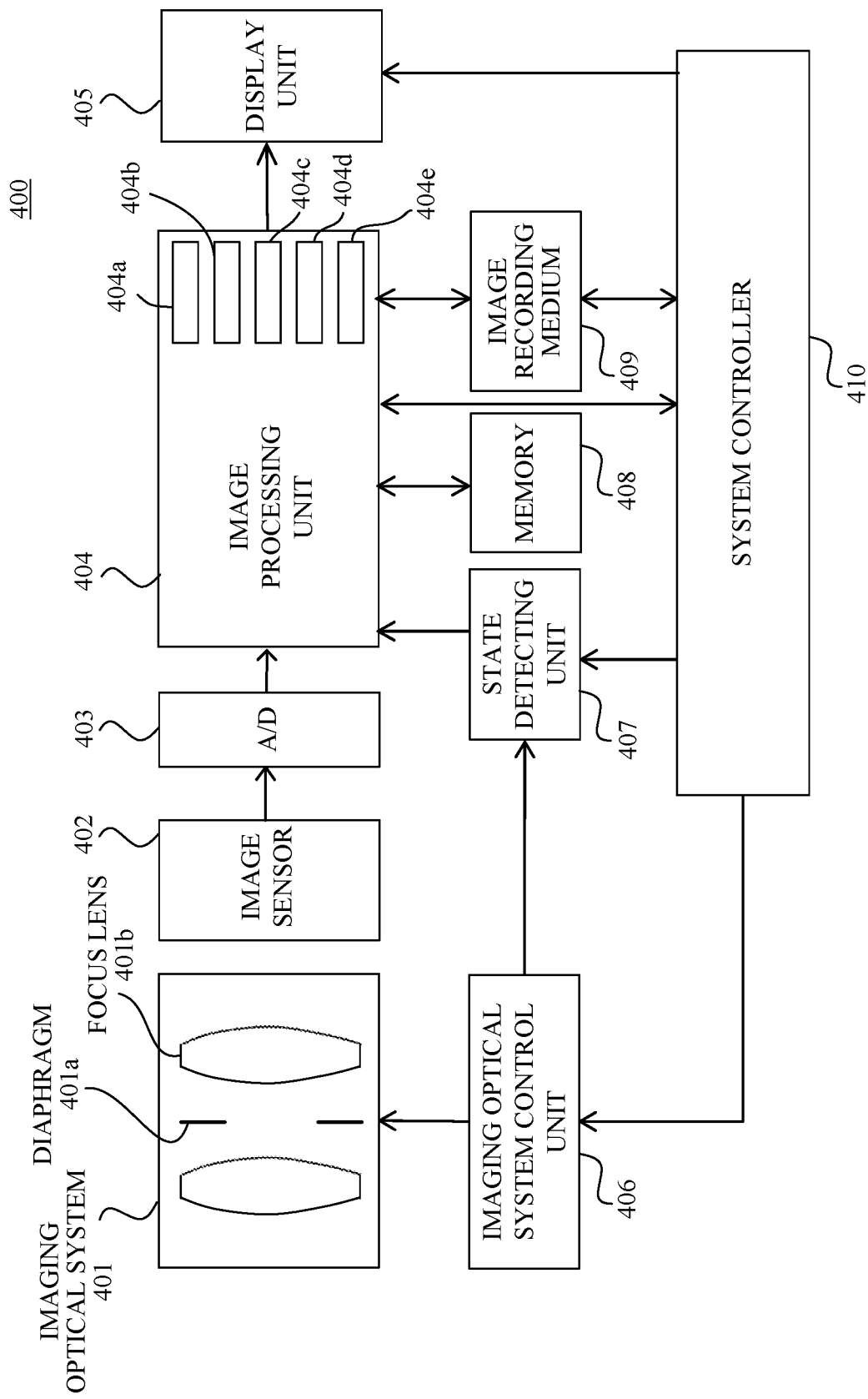
FIG. 13 is a block diagram of an image pickup apparatus according to a fourth embodiment.

Referring now to FIG. 13, a description will be given of an image pickup apparatus according to a fourth embodiment of the present invention. FIG. 13 is a block diagram of an image pickup apparatus 400 according to this embodiment. An image processing program that provides the image restoration processing (the same image processing method as that of each of the first and second embodiments) of the captured image is installed in the image pickup apparatus 400, and executed by an image processing unit 404 (image processing apparatus) inside the image pickup apparatus 400.

The image pickup apparatus 400 includes an imaging optical system 401 (lens) and an image pickup apparatus body (camera body). The imaging optical system 401 includes a diaphragm (aperture stop) 401a and a focus lens 401b, and is integrated with an image pickup apparatus body. However, this embodiment is not limited to this example, and is applicable to an image pickup apparatus in which the imaging optical system 401 is interchangeably mounted on the image pickup apparatus body. The imaging optical system 401 may include a phase mask (wavefront modulation element) that slows down performance fluctuations in the depth direction.

An image sensor 402 generates a captured image by photoelectrically converting an object image (optical image, imaged light) formed via the imaging optical system 401. That is, the object image is photoelectrically converted into an analog signal (electrical signal) by the image sensor 402. This analog signal is converted into a digital signal by an A/D converter 403, and this digital signal is input to the image processing unit 404.

The image processing unit (image processing apparatus) 404 performs predetermined processing and the above image restoration processing for the digital signal. The image processing unit 404 includes a captured image acquiring unit (image acquiring unit) 404a, a restoration filter acquiring unit 404b, an image restoration processing unit 404c, and a pixel increasing processing unit 404d. In a case where the image processing unit 404 performs processing according to the flow of the second embodiment, it further includes a processing determining unit 404e.

The image processing unit 404 acquires the imaging condition information on the image pickup apparatus from a state detecting unit 407. The imaging condition information is information relating to the F-number, the imaging distance, the focal length of the zoom lens, and the like. The state detecting unit 407 can acquire the imaging condition information directly from the system controller 410, but is not limited to this example. For example, the imaging condition information regarding the imaging optical system 401 can also be acquired from an imaging optical system control unit 406. Since the processing flow (image processing method) of the image restoration processing according to this embodiment is the same as that of the first embodiment described with reference to FIG. 7, a description thereof will be omitted.

The OTF or the image restoration filter is stored in a memory 408. The output image processed by the image processing unit 404 is stored in the image recording medium 409 in a predetermined format. Displayed on the display unit 405 is an image obtained by performing predetermined processing for display for an image that has received the image restoration processing according to this embodiment. However, the present invention is not limited to this example, and the display unit 405 may display an image that has received simple processing for high-speed display.

A series of controls according to this embodiment is performed by the system controller 410, and the mechanical driving of the imaging optical system 401 is performed by the imaging optical system control unit 406 based on the instruction of the system controller 410. The imaging optical system control unit 406 controls the aperture diameter of the diaphragm 401a as an imaging state setting of the F-number. For focusing according to the object distance, the imaging optical system control unit 406 controls the position of the focus lens 401b using an unillustrated autofocus (AF) mechanism or manual focus mechanism. Functions such as aperture diameter control and manual focus of the diaphragm 401a may not be performed according to the specifications of the image pickup apparatus 400.

An optical element such as a low-pass filter or an infrared cutting filter may be inserted into the imaging optical system 401, but in a case where an element that affects the characteristic of the OTF such as a low-pass filter is used, consideration may be necessary to create the image restoration filter. The infrared cutting filter also affects each PSF of the RGB channel, which is an integral value of the PSF of the spectral wavelength, especially the R channel of the PSF, so it may be necessary to consider it in creating the image restoration filter. In this case, as described in the first embodiment, a rotationally asymmetric transfer function is added after the OTF is rearranged.

This embodiment thus uses the OTF and the image restoration filter stored in the memory 408 of the image pickup apparatus, but in a modification the image pickup apparatus may acquire the OTF and the image restoration filter stored in a storage medium such as a memory card.

Thus, in each embodiment, the image processing apparatus 320 (image processing unit 404) includes (at least one processor or circuit configured to execute a plurality of tasks including) a captured image acquiring unit (task) 322 (404a), an image restoration processing unit (task) 324 (404c), and a pixel increasing processing unit (task) 325 (404d). The captured image acquiring unit acquires a first image and a second image (a plurality of captured images) having imaging positions different from each other. The image restoration processing unit performs image restoration processing for the first image and the second image, and acquires the first restored image and the second restored image, respectively. The pixel increasing processing unit acquires a pixel increased image using the first restored image and the second restored image. The pixel increased image has more pixels than each of the first image and the second image. The image processing apparatus may include a restoration filter acquiring unit 323 (404b) for acquiring an image restoration filter. The image restoration processing unit performs image restoration processing for the first image and the second image using the image restoration filter.

The image processing apparatus may include a processing determining unit for determining whether to perform first processing or second processing. In a case where the processing determining unit determines that the first processing is to be performed, the image restoration processing unit performs the image restoration processing for the first image and the second image, and acquires the first restored image and second restored image. The pixel increasing processing unit acquires the pixel increased image using the first restored image and the second restored image. In a case where the processing determining unit determines that the second processing is to be performed, the pixel increasing processing unit acquires a pixel increased image using the first image and the second image, and the image restoration processing unit acquires a restoreed pixel increased image by performing the image restoration processing for the pixel increased image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image processing apparatus, an image pickup apparatus, an image processing method, and a storage medium, each of which can reduce blurs caused by the aberration and diffraction of an optical system while reducing a data amount and a calculational amount in the pixel increasing processing and the image restoration processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No 2021-027596, filed on Feb. 24, 2021, which is hereby incorporated by reference herein in its entirety.

What is claimed is:

1. An image processing apparatus comprising at least one processor or circuit configured to execute a plurality of tasks including:
   an image acquiring task configured to acquire a first image and a second image that have been obtained by imaging at imaging positions different from each other;
   an image restoration processing task configured to acquire a first restored image and a second restored image by performing image restoration processing for the first image and the second image, respectively;
   a pixel increasing processing task configured to acquire a pixel increased image using the first restored image and the second restored image; and
   a processing determining task configured to determine whether to perform first processing or second processing,
   wherein in a case where the processing determining task determines that the first processing is to be performed, the image restoration processing task performs the image restoration processing for the first image and the second image, and acquires the first restored image and the second restored image, and the pixel increasing processing task acquires the pixel increased image using the first restored image and the second restored image,
   wherein in a case where the processing determining task determines that the second processing is to be performed, the pixel increasing processing task acquires the pixel increased image using the first image and the second image, and the image restoration processing task performs the image restoration processing for the pixel increased image and acquires a restored pixel increased image, and
   wherein the processing determining task determines whether to perform the first processing or the second processing based on a point spread function or an optical transfer function of an imaging optical system.

2. The image processing apparatus according to claim 1, wherein the pixel increased image has pixels more than those of each of the first image and the second image.

3. The image processing apparatus according to claim 1, wherein the plurality of tasks further include a restoration filter acquiring task configured to acquire an image restoration filter, and wherein the image restoration processing task performs the image restoration processing for the first image and the second image using the image restoration filter.

4. The image processing apparatus according to claim 3, wherein the image restoration filter is generated based on an optical transfer function at a frequency lower than a Nyquist frequency and an optical transfer function at a frequency higher than the Nyquist frequency.

5. The image processing apparatus according to claim 3, wherein the image restoration filter is generated based on a restoration characteristic at a frequency lower than a Nyquist frequency and a restoration characteristic at a frequency higher than the Nyquist frequency.

6. The image processing apparatus according to claim 3, wherein the image restoration filter is generated based on optical information on an imaging optical system.

7. The image processing apparatus according to claim 1, wherein the processing determining task is further configured to determine, based on restoration target data, whether to perform the first processing or the second processing, and
wherein the processing determining task determines that the first processing is to be performed in a case where the restoration target data relates to a moving image, and that the second processing is to be performed in a case where the restoration target data relates to a still image.

8. The image processing apparatus according to claim 1, wherein the processing determining task determines that the first processing is to be performed in a case where the point spread function is larger than a predetermined value, and that the second processing is to be performed in a case where the point spread function is smaller than the predetermined value.

9. The image processing apparatus according to claim 1, wherein the processing determining task determines that the first processing is to be performed in a case where an absolute value of the optical transfer function is smaller than a threshold at a predetermined frequency, and that the second processing is to be performed in a case where the absolute value of the optical transfer function is larger than the threshold at the predetermined frequency.

10. The image processing apparatus according to claim 1, wherein the processing determining task is further configured to determine whether to perform the first processing or the second processing, based on an F-number of an imaging optical system.

11. The image processing apparatus according to claim 10, wherein the processing determining task determines that the first processing is to be performed in a case where the F-number is larger than a predetermined F-number, and that the second processing is to be performed in a case where the F-number is smaller than the predetermined F-number.

12. The image processing apparatus according to claim 10, wherein the processing determining task determines that the first processing is to be performed in a case where the F-number is smaller than a predetermined F-number, and that the second processing is to be performed in a case where the F-number is larger than the predetermined F-number.

13. The image processing apparatus according to claim 1, wherein a number of taps in an image restoration filter for the image restoration processing in the first processing is different from the number of taps in the image restoration filter for the image restoration processing in the second processing.

14. An image pickup apparatus comprising:
an image sensor configured to photoelectrically convert an optical image formed by an imaging optical system; and
an image processing apparatus,
wherein the image processing apparatus includes at least one processor or circuit configured to execute a plurality of tasks including:
an image acquiring task configured to acquire a first image and a second image that have been obtained by imaging at imaging positions different from each other;
an image restoration processing task configured to acquire a first restored image and a second restored image by performing image restoration processing for the first image and the second image, respectively;
a pixel increasing processing task configured to acquire a pixel increased image using the first restored image and the second restored image; and
a processing determining task configured to determine whether to perform first processing or second processing,
wherein in a case where the processing determining task determines that the first processing is to be performed, the image restoration processing task performs the image restoration processing for the first image and the second image, and acquires the first restored image and the second restored image, and the pixel increasing processing task acquires the pixel increased image using the first restored image and the second restored image,
wherein in a case where the processing determining task determines that the second processing is to be performed, the pixel increasing processing task acquires the pixel increased image using the first image and the second image, and the image restoration processing task performs the image restoration processing for the pixel increased image and acquires a restored pixel increased image, and
wherein the processing determining task determines whether to perform the first processing or the second processing based on a point spread function or an optical transfer function of an imaging optical system.

15. The image pickup apparatus according to claim 14, wherein the imaging optical system includes a phase mask.

16. An image processing method, comprising:
acquiring a first image and a second image that have been obtained by imaging at imaging positions different from each other;
acquiring a first restored image and a second restored image by performing image restoration processing for the first image and the second image, respectively;
acquiring a pixel increased image using the first restored image and the second restored image; and
determining whether to perform first processing or second processing,
wherein in a case where it is determined that the first processing is to be performed, the image restoration processing is performed for the first image and the second image to acquire the first restored image and the second restored image, and the pixel increased image is acquired using the first restored image and the second restored image,
wherein in a case where it is determined that the second processing is to be performed, the pixel increased image is acquired using the first image and the second image, and the image restoration processing is performed for the pixel increased image to acquire a restored pixel increased image, and wherein whether to perform the first processing or the second processing is determined based on a point spread function or an optical transfer function of an imaging optical system.

17. A non-transitory computer readable storage medium storing a program for causing a computer to execute the image processing method according to claim 16.

* * * * *